(12) United States Patent
Gottschald

(10) Patent No.: US 6,785,585 B1
(45) Date of Patent: Aug. 31, 2004

(54) METHOD FOR MARKING OR DRILLING HOLES IN GLASS LENSES AND DEVICE FOR REALIZING THE SAME

(75) Inventor: Lutz Gottschald, Meerbusch (DE)

(73) Assignee: Wernicke & Co. GmbH (DE)

(*) Notice: Subject to any disclaimer, the term of this patent is extended or adjusted under 35 U.S.C. 154(b) by 0 days.

(21) Appl. No.: 09/601,774

(22) PCT Filed: Jan. 27, 1999

(86) PCT No.: PCT/EP99/00512

§ 371 (c)(1),
(2), (4) Date: Aug. 7, 2000

(87) PCT Pub. No.: WO99/39871

PCT Pub. Date: Aug. 12, 1999

(30) Foreign Application Priority Data

Feb. 5, 1998 (DE) .......................... 198 04 428

(51) Int. Cl.$^7$ .............................................. G06F 19/00
(52) U.S. Cl. .................... 700/159; 700/164; 700/180; 351/110; 351/178; 451/240; 451/256; 451/5
(58) Field of Search ................................ 700/117, 159, 700/160, 164, 161, 195, 166, 183, 180, 114, 169; 351/110, 178; 33/200, 549; 451/5, 6, 240, 256; 716/11

(56) References Cited

U.S. PATENT DOCUMENTS

| 4,781,452 A | | 11/1988 | Ace ............................ 351/177 |
| 5,220,512 A | * | 6/1993 | Watkins et al. ................ 716/11 |
| 5,845,408 A | * | 12/1998 | Chansavoir et al. .......... 33/200 |
| 6,192,321 B1 | * | 2/2001 | Grumstrup et al. ......... 702/113 |
| RE37,461 E | * | 12/2001 | Izumitami ................... 351/110 |

FOREIGN PATENT DOCUMENTS

| DE | 4003001 | | 6/1991 |
| DE | 4019866 | | 1/1992 |
| DE | 4233400 | | 5/1994 |
| DE | 19524391 | * | 11/1996 |
| DE | 19616572 | | 2/1997 |
| EP | 0822031 | | 2/1998 |
| FR | 2751256 | | 1/1998 |
| JP | 08155806 | | 6/1996 |
| JP | 08155945 | | 6/1996 |
| JP | 8-155945 | * | 6/1996 |
| JP | 8-252870 | * | 10/1996 |
| JP | 08252870 | | 10/1996 |

OTHER PUBLICATIONS

Abstract of Derwent DE 42 33 400.
Abstract of Derwent DE 40 03 001.
Abstract of Derwent DE 40 19 866.
Abstract of Derwent DE 196 16 572.

* cited by examiner

Primary Examiner—Leo Picard
Assistant Examiner—Steven R. Garland
(74) Attorney, Agent, or Firm—Ostrolenk, Faber, Gerb & Soffen, LLP

(57) ABSTRACT

To at least one of mark and drill holes in a workpiece spectacle lens, a position of bores of a lens template is scanned, in which the template includes one of a template spectacle lens, a pattern disk and a support disk. The scanning is performed by a scanning arrangement situated in one of a device for coquilles, a device to cut support disks for spectacle frames, and a spectacle lens edging machine. Data is acquired concerning the position of the bores in accordance with the scanning, and is then fed to a computer. The data includes at least one of rectangular and polar coordinates of the position of the bores. At least one of marking and drilling the holes in the workpiece spectacle lens is performed using a Computer-Numeric-Controlled device in accordance with the data concerning the position of the bores.

19 Claims, 3 Drawing Sheets

METHOD FOR MARKING OR DRILLING HOLES IN GLASS LENSES AND DEVICE FOR REALIZING THE SAME

FIELD OF THE INVENTION

The invention relates to a method for marking or drilling holes in spectacle lenses, and to a device for carrying out the method.

BACKGROUND INFORMATION

The nose bridge and the bows of rimless spectacles are usually screwed onto the form-ground spectacle lenses. It is therefore necessary for the bores for fastening the nose bridge and the bows to be made in a positionally accurate fashion in the form-ground spectacle lenses. The position of these bores is determined by the shape of the spectacle lenses and of the nose bridge and the bows and fixed by the manufacturer of these parts. For the purpose of selecting such rimless spectacles, the elements, screwed onto a so-called support disk, are supplied and permit the rimless spectacles to be tried without the use of optical lenses. Frequently, a pattern disk for grinding the contour of the spectacle lenses is also supplied with the rimless spectacles, and this pattern disk is likewise provided by the manufacturer with the bores for fastening the spectacle frame elements.

The optician uses the pattern disk or support disk provided with the fastening bores to mark the bores on a spectacle lens, and drills the holes by means of a suitable drilling device.

If the spectacle lenses are to be exchanged while retaining the elements of the spectacle frame, because, for example, the visual acuity of the spectacle wearer has changed, or because one of the spectacle lenses has been broken, it is possible to use an existing spectacle lens, already provided with bores, for marking the bores.

SUMMARY OF THE INVENTION

It is obvious that this marking of the bores and the subsequent drilling of the holes are attended by a substantial manual outlay which requires great skill on the part of the optician and therefore gives rise to costs which can also rise by virtue of the fact that drilling the holes by means of conventional drilling devices frequently leads to breakage of the spectacle lens, which can then no longer be used.

It is the object of the invention to simplify and speed up the marking or drilling of holes in spectacle lenses, to increase the accuracy and to reduce the risk of lens breakage when drilling.

Starting from this formulation of the problem, a method is proposed for marking or drilling holes in spectacle lenses, in which, according to the invention, the position of bores in a spectacle lens or a pattern disk or a support disk is scanned with or without contact, the data acquired on the position of the bores are fed to a computer as rectangular or polar coordinates and used to control the marking or drilling by means of a CNC-controlled marking or drilling device.

The invention proceeds from the consideration that the outlay on acquiring the data on the position of the bores is small, since only one pair of values $(x, y)$, $(r, \phi)$ is required for each bore, and these pairs of values can accurately and quickly effect control of the marking or the drilling by means of a CNC-controlled marking or drilling device.

The marking of the holes can be performed by means of an ink jet or a counterboring cutter. In this case, the actual drilling of the holes is carried out in a conventional drilling device.

The holes are preferably drilled by means of a CNC-controlled drilling device, it being necessary to adapt the drilling tool to the spectacle lens material. If, for example, silicate lenses are involved, it is preferred to use a diamond drilling tool, while drilling tools made from hard metal are suitable for drilling plastic lenses.

The scanning of the position of the bores can be carried out, for example, in a centering device for coquilles. Such centering devices serve the purpose of mounting a holding element in the form of a block or sucker on a coquille which can be detected in a viewing optics or on a screen, and on which an image of the form-ground spectacle lens is superimposed in accordance with the spectacle frame, in order to insert the coquille in a positionally accurate fashion into a spectacle lens holding shaft on a spectacle lens edging machine, after which form grinding is carried out in accordance with the prescribed spectacle lens shape.

The scanning of the position of the bores can also be carried out in a device for scanning the contour of a pattern disk. By means of such a device, the contour of a pattern disk is acquired in the form of a data record and used to control the form grinding by means of a CNC-controlled spectacle lens edging machine. Moreover, it is also possible for the position of the bores to be scanned in a device for cutting support disks for spectacle frames. Support disks are used, inter alia, for the purpose of marking the viewing points of the spectacle wearer during adaptation to the new spectacle frame. Such a device for cutting support disks is described in DE 40 03 001 C1 of the same applicant.

A further possibility for scanning the position of the bores consists in making use for this purpose of a spectacle lens edging machine in which the marking or drilling of the holes is also performed. It is advantageous in this case to make use of the same computer for acquiring the data and for controlling the marking or drilling, as well as for controlling the form grinding of the spectacle lens.

A video system with screen display of the contour of the spectacle lens or the pattern disk or the support disk and the bores can also be used for scanning the position of the bores if this video system is set up such that the acquisition of the data on the position of the bores is performed by means of automatic image evaluation.

In the case of a video system without automatic image evaluation, or if the spectacle lens, the pattern disk or the support disk are laid onto a digitizing tablet, the data on the position of the bores can be acquired by marking the bores, which are visible on the screen or the digitizing tablet, by means of a cursor which can be moved by a keyboard or a computer mouse, and are recorded by clicking on the respective bore.

The position of the holes in spectacle lenses can be input in a particularly simple way as a data record into a computer which is used for directly controlling the marking or drilling by means of a CNC-controlled marking or drilling device. This inputting of the data record can be accomplished in the form of rectangular or polar coordinates by means of a keyboard connected to the computer, or by reading in the data record, which is stored on a floppy disk, an EPROM or a magnetic strip, or is represented by means of a barcode. These stored data records can be supplied by the manufacturer of the spectacle frame, and can also comprise a data record for grinding the circumferential contour of the spectacle lens. It is likewise possible to acquire these data records by scanning a spectacle lens, a pattern disk or a support disk.

In order to solve the problem mentioned at the beginning, there is proposed a marking or drilling device for marking or drilling holes in spectacle lenses, having an input device for inputting the coordinates ($X_n, Y_1; X_2, Y_2$) or ($r_n, \phi_n$) of the holes into a computer and a positioning device, controlled by the computer in accordance with the input coordinates, for the marking or drilling device with reference to the spectacle lens. A laser drill may be used as the marking or drilling device.

If use is made of a drilling tool running at high speed, it is possible to use for this a drive designed as an air turbine, as a combined air-water turbine or as a high-frequency electric motor.

Particularly preferred is a marking or drilling device on a spectacle lens edging machine, having a computer for controlling the form grinding of spectacle lenses, at least one grinding wheel in a grinding chamber, a spectacle lens holding shaft which can rotate in a fashion capable of angle encoding, can be adjusted radially and axially relative to the grinding wheel and can be locked, an angle sensor for acquiring the angle of rotation ($\phi_n$) of the spectacle lens holding shaft, a position sensor for acquiring the radial distance ($X_n$) of the spectacle lens holding shaft from the grinding wheel, a position sensor for acquiring the axial position ($Z_n$) of the spectacle lens holding shaft with reference to the grinding wheel, and an input device for inputting coordinates ($X_1, Y_1; X_2, Y_2$) of the holes into the computer.

By virtue of the fact that the marking or drilling device is arranged on the spectacle lens edging machine, it can be controlled by the same computer which is also used to control the form grinding of spectacle lenses.

The marking or drilling device can be arranged such that it can be telescoped in the X-direction either in a niche of the grinding chamber or outside the grinding chamber, in the first case the spectacle lens to be marked or drilled being held at that point in the spectacle lens holding shaft at which the form grinding is also carried out while, in the second case, a holder is to be provided for a spectacle lens, which is to be marked or drilled, outside the grinding chamber on the spectacle lens holding shaft.

When the marking or drilling device is coupled in terms of movement to the spectacle lens holding shaft or the grinding wheel in the X-direction and Z-direction, the positioning of the marking or drilling device with reference to the spectacle lens held by the spectacle lens holding shaft can be performed by the computer in a fashion controlled as a function of the input coordinates of the holes, the same movement control being used for this purpose as also serves for the form grinding of the spectacle lens.

It is also advantageously possible to arrange the scanning device for the position of the bores in a spectacle lens or a pattern disk or a support disk on the spectacle lens edging machine, and to couple it in terms of movement to the spectacle lens holding shaft or the grinding wheel in the X-direction and Z-direction. In this case, a sensing arm can project radially into the region of the spectacle lens held by the spectacle lens holding shaft, of the pattern disk or the support disk, a sensing element which acts with or without contact being arranged on the sensing arm.

When the sensing element is designed as a sensing pin, this sensing pin can guided in the X-direction and Z-direction up to the respective bore in the spectacle lens or the pattern disk or support disk, which is brought into the region of the sensing element by rotating the spectacle lens holding shaft. The coordinates of the hole are recorded in this case and fed to the computer.

The sensing element can also be designed as an optoelectronic sensing device which is capable of recording the coordinates of a hole in a spectacle lens held by the spectacle lens holding shaft, a pattern disk or a support disk.

A linear, optoelectronic sensing device, for example a charge-coupled (CCD), linear image scanner can preferably be arranged on the sensing arm which, during a revolution of the spectacle lens holding shaft detects both the position of the bores and the circumferential contour of a spectacle lens, of a pattern disk or a support disk, and feeds them to the computer for controlling the form grinding and the marking and drilling of the holes.

The scanning device can be arranged both inside and outside the grinding chamber and serves simultaneously as a marking or drilling device when, for example, the sensing pin is simultaneously the drilling tool, or when the optoelectronic sensing device is designed as a laser device which, by controlling the intensity of the laser beam, can be used both as a scanning device and as a marking or drilling device.

BRIEF DESCRIPTION OF THE DRAWINGS

The invention is explained in more detail below with the aid of a plurality of exemplary embodiments illustrated in the drawing, in which.

DETAILED DESCRIPTION OF THE PREFERRED EMBODIMENT

Figure 1:
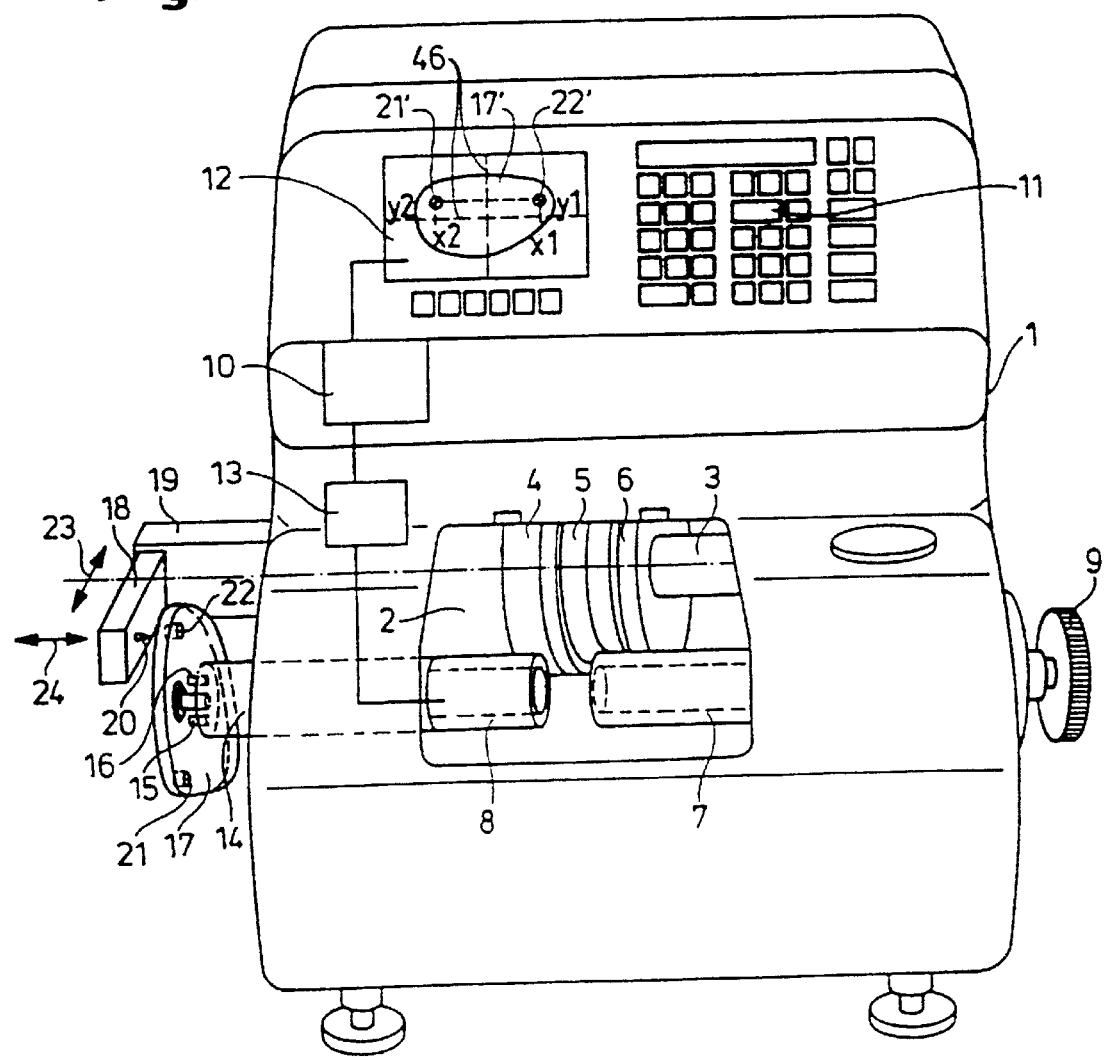
FIG. 1 shows a diagrammatic front view of a spectacle lens edging machine having a device for scanning the position of bores in a grinding wheel, outside the grinding-chamber.

The spectacle lens edging machine illustrated in FIG. 1 has a housing 1 with a grinding chamber 2 in which a pregrinding wheel 4, which is arranged on a shaft 3 and has a cylindrical circumference, and two beveling grinding wheels 5, 6 with different beveling grooves are arranged. Arranged with its axis parallel to the shaft 3 with the grinding wheels 4, 5, 6 is a spectacle lens holding shaft made from two half shafts 7, 8, of which the half shaft 7 can be axially displaced by means of a handle 9, in order to clamp a rough cast lens (not illustrated). The grinding chamber 2 is closed during the grinding operation by means of a cover (not illustrated).

For the purpose of grinding, the shaft 3 with the grinding wheels 4, 5, 6 is set rotating rapidly, while a rough cast lens held by the spectacle lens holding shaft 7, 8 rotates slowly. The distance of the spectacle lens holding shaft 7, 8 from the shaft 3 with the grinding wheels 4, 5, 6 is controlled by a computer 10 in which control data for grinding the rough cast lens in accordance with the shape of a selected spectacle frame are stored.

Also arranged on the housing 1 are an input keyboard 11 and a screen 12. The input keyboard 11 can be used to call spectacle lens contours stored in a known way, and to lead them to the controller of the spectacle lens edging machine for the purpose of spectacle lens machining.

It is also possible to use the input keyboard 11 to input personal data of the spectacle wearer, for example the pupil separation, the axis position of a cylindrical or prismatic cut of the spectacle lens, or the position of a reading portion.

A screen 12 is used to display the input data. It is also possible to illustrate on the screen 12 the circular rough cast lens and/or a spectacle lens which is to be form-ground in accordance with the input data.

An end 14 of the half shaft 8 is led out at the side of the housing 1. Arranged on this end 14 is a holder in the form of pins 15, 16 of different diameters for a pattern disk 17. The pattern disk has corresponding holes of corresponding diameter, and so it can be mounted on the projecting end 14 of the half shaft 8 only in a specific angular position.

Arranged on a holder 19 projecting from the housing 1 is a sensing arm 18 which can be telescoped and on whose free end in the region of the pattern disk 17 there is arranged a sensing element 20 which is illustrated here as a sensing pin. The sensing arm 18 can be moved in the direction of the arrow 23, while the holder 19 can be moved in the direction of the arrow 24.

By rotating the spectacle lens holding shaft 7, 8, a bore 21 and a bore 22 are adjusted such that the sensing pin 20 can be inserted into the bore 21 or 22 by displacing the sensing arm 18 in the direction of the arrow 23 and displacing the holder 19 in the direction of the arrow 24. The associated angle φ of the spectacle lens holding shaft 7, 8 is recorded by an angle sensor 13, while the distance r of the bore 21 or 22 from the axis of the spectacle lens holding shaft 7, 8 is acquired by a position sensor (not illustrated) connected to the sensing arm 18. The recorded coordinates of the bores 21 and 22 pass into the computer 10 and are displayed on the screen 12 in the image 17' of the pattern disk 17 as images of the bores 21' and 22', respectively. Since the screen 12 is provided with a rectangular axis intersection 46, the coordinates $X_1, Y_1$ of the bore 22' and the coordinates $X_2, Y_2$ of the bore 21' can be read off on the screen 12 and used to mark and/or drill appropriate holes in a spectacle lens held between the half shafts 7, 8 when the spectacle lens edging machine has an appropriate marking or drilling device.

The coordinates $X_1, Y_1$ and $X_2, Y_2$ for the bores 22', 21' can also be used for the purpose of driving a marking or drilling device separated from the spectacle lens edging machine, or to input the coordinates into such a marking or drilling machine by means of a keyboard or in another suitable way such as, for example, by means of a floppy disk, an EPROM, a barcode or a magnetic strip.

The holder 19 can also be coupled in terms of movement in the X-direction and Z-direction to the movement controller of the grinding wheels 4, 5, 6 with respect to the spectacle lens holding shaft 7, 8, with the result that the movements of the holder 19 effect the recording of the coordinates of the holes 21, 22 via corresponding position pickups on the movement controller for the grinding wheels 4, 5, 6. In this case, the sensing arm 18 can be permanently arranged on the holder 19, although it is also possible that it can be telescoped from a idle position into an operating position.

In conjunction with coupling the movement to the grinding wheels 4, 5, 6, the arrangement of the sensing arm such that it can be telescoped is particularly advantageous when the sensing device 18, 19, 20 is arranged (in a way that is not illustrated) in the grinding chamber 2, and the sensing arm 18 is located in the idle position in a niche of the grinding chamber 2.

Instead of a pattern disk 17, it is also possible for a spectacle lens having fastening holes, or a support disk to be fastened on the projecting end 14 of the half shaft 8, in order to acquire the position of the holes.

Instead of a sensing pin 20, it is also possible to arrange an optoelectronic sensing element on the sensing arm 18, in order to record the position of the holes 21, 22.

When this optoelectronic sensing element is designed as a charge-coupled (CCD), linear image scanner, it is thereby possible to determine both the circumferential contour of a pattern disk 17 of a form-ground spectacle lens or of a support disk 17, and the position of the bores, and to use them to control the form grinding and the marking or drilling of the holes.

Figure 2:
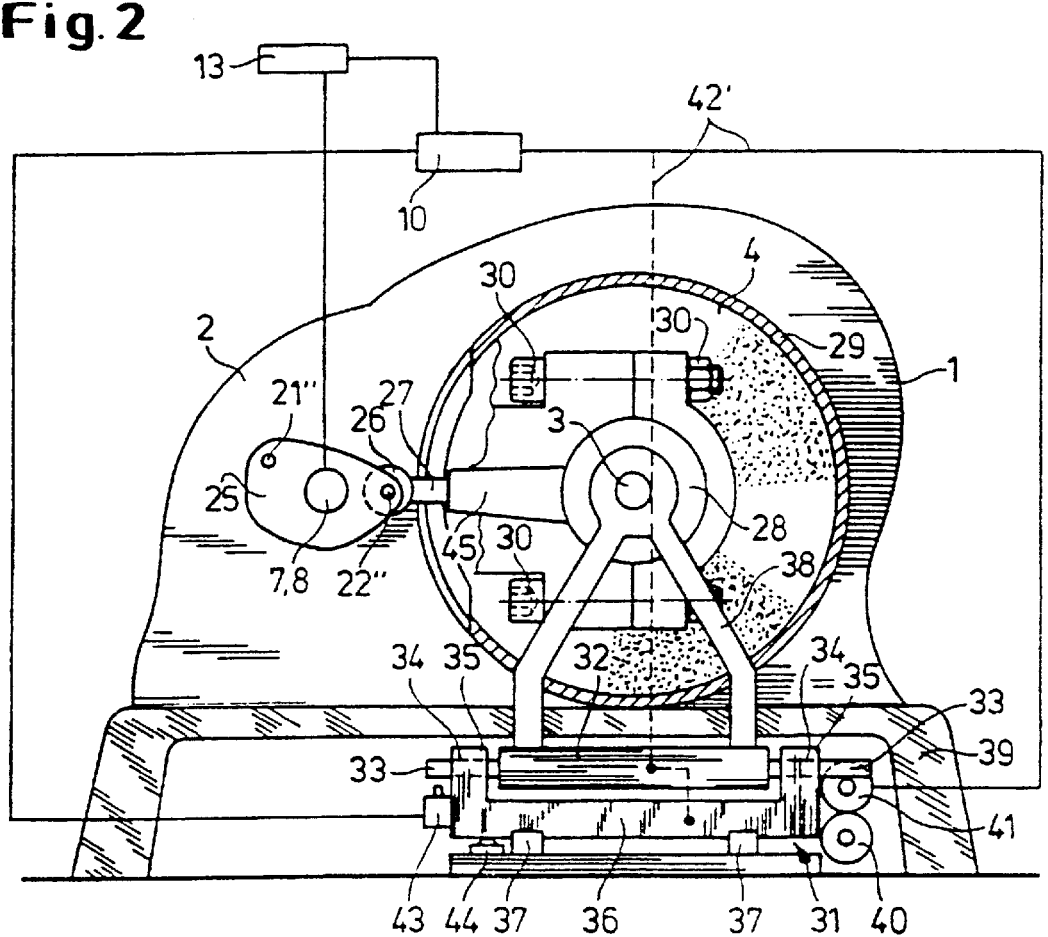
FIG. 2 shows a cross section through a spectacle lens edging machine having a device for scanning and/or a device for marking or drilling holes in spectacle lenses.

An already form-ground spectacle lens 25 which is held by the spectacle lens holding shaft 7, 8 is illustrated in the spectacle lens edging machine illustrated in FIG. 2.

A guide 45 for a telescopic arm 27, which supports a high-speed drill drive 26, is arranged on a bearing neck 28 of a bearing support 38 for the shaft 3 of the grinding wheels 4, 5, 6. Air turbines, combined air-water turbines or high-frequency electric motors are suitable as a drill drive.

Also fastened, by means of fastening screws 30, on the bearing neck 28 is a spray guard 29 which encompasses the grinding wheels 4, 5, 6. The bearing support 38 is connected to a slide part 32 of a compound slide 31. The slide part 32 is guided by means of guide bars 33 in bores 34 in attachments 35 of a second slide part 36. Guide rails 37 run at right angles to the guide bars 33 of the slide part 32, with the result that the compound slide 31 can be displaced under computer control in the X-direction, that is to say in the direction of the guide bars 33, and in the Z-direction, that is to say in the direction of the guide rails 37. A drive motor 40, which acts on the slide part 32 via an electromagnetic clutch 41, is illustrated, and a position sensor 43 serves to monitor the positional control in the X-direction. A corresponding position' sensor 44 serves to monitor the positional control in the Z-direction. Both the drives in the X-direction and Z-direction, and the corresponding position sensors 43, 44 are connected to the computer 10 via control lines 42.

The compound slide 31 with the drives and position sensors 43, 44 is arranged in a machine subframe 39 which also supports the housing 1.

The form grinding of the spectacle lens 25 is performed under the control of a computer by means of the computer 10, with the use of a data record which is input into the computer and corresponds to the shape of the spectacle lens.

Before the form grinding, or after the form grinding, the bores 21", 22" can be made in the spectacle lens 25 by advancing the high-speed drill drive 26 on the telescopic arm 27 from an idle position (not illustrated), in which it is located in a niche of the grinding chamber 2, into the operating position illustrated in FIG. 2.

In the exemplary embodiment illustrated, the drill drive on the telescopic arm 27 with the guide 45 is coupled to the movement of the compound slide 31. Consequently, the X-coordinate of the holes 21", 22" are set by moving the slide part 32 in accordance with the input coordinates. At the same time, the spectacle lens holding shaft 7, 8 is rotated in accordance with the position of the bore 21" or 22" such that the bore is situated on the vertical connecting line of the axes of the grinding wheel shaft 3 and the spectacle lens holding shaft 7, 8, after which the slide part 36 is moved in the Z-direction and the drill drive 26 is set operating. A drilling tool on the drill drive 26 now drills the holes 21", 22" by virtue of the fact that the slide part 36 is imparted a corresponding feed movement.

When the telescopic arm 27 is arranged in a guide 45 which is not coupled in terms of movement to the compound slide 31, but is fastened at a suitable point on the machine frame 39, the drill drive 26 can be set to the X-coordinate 21", 22" by controlling the movement of the telescopic arm 27 by means of the computer 10, without there being a need to move the compound slide 31 for this purpose. In this case, it must be possible to provide for an axial feed movement of the drilling tool on the drill drive 26 toward the spectacle lens 25 or, vice versa, for an axial movement of the spectacle lens 25 toward the drilling tool on the drill drive 26.

It is also possible to use a laser drilling device instead of a drilling tool with a high-speed drill drive 26. Moreover, it is possible to use the drilling device 26, 27 as scanning device for the position of the bores 21, 22 in a pattern disk when this pattern disk is clamped in the grinding chamber 2 between the half shafts 7, 8 and the drilling tool is used as sensing pin for insertion into the holes 21, 22 in a pattern disk 17, or when, in the case of a laser drilling device, the laser beam is used to determine the position of the holes.

It is likewise possible for a spectacle lens or a support disk to be clamped between the half shafts 7, 8, in order to scan the corresponding bores.

Furthermore, it is also possible for the scanning device 18, 19, 20 described with reference to FIG. 1 to be arranged in addition to the drilling device 26, 27 in the grinding chamber 2 of the spectacle lens edging machine when the scanning of the holes and the drilling are to be performed by means of separate devices.

Figure 3:
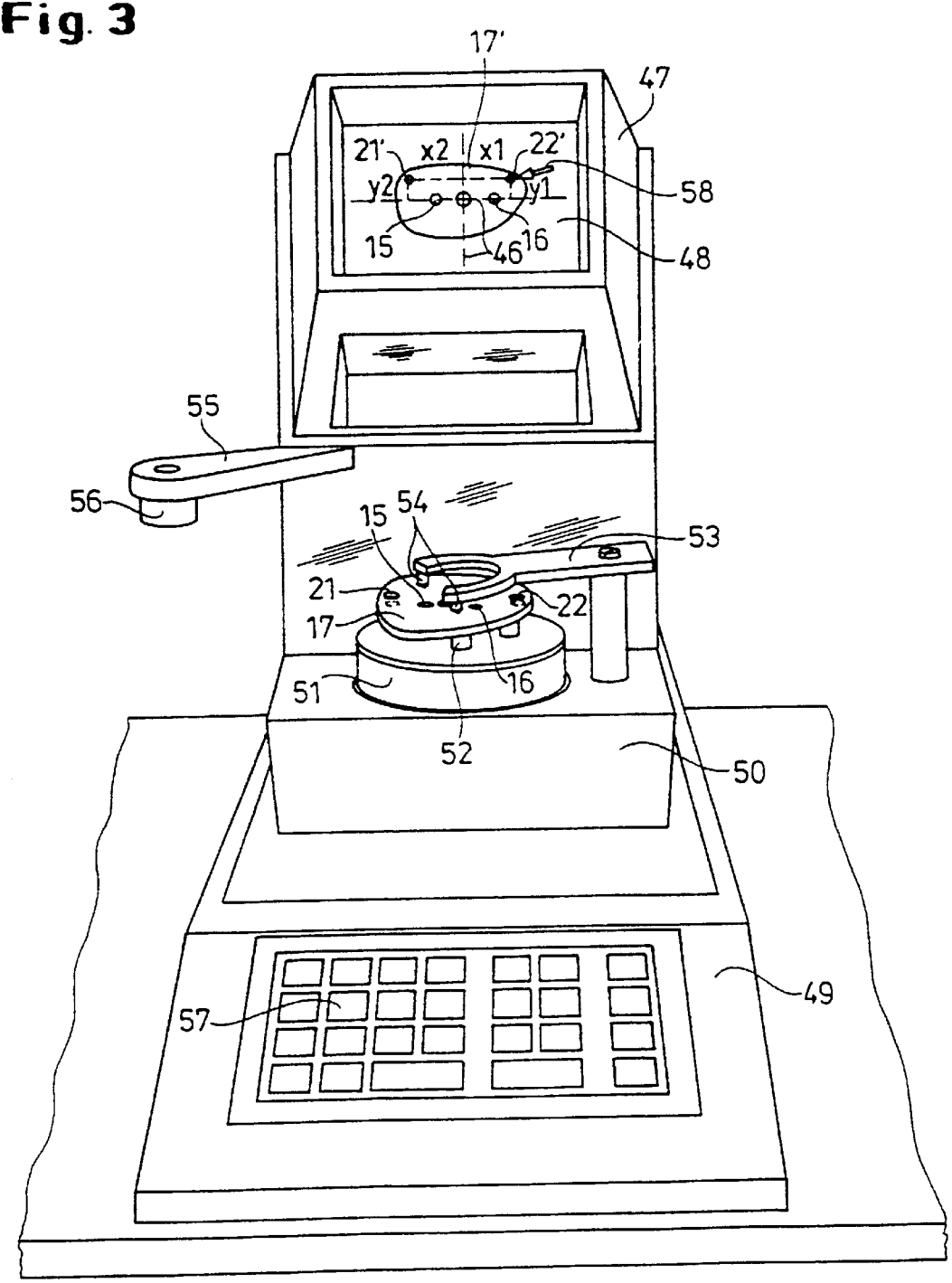
FIG. 3 shows a centering device set up for scanning the position of the bores in spectacle lenses, pattern disks or support disks.

Illustrated in FIG. 3 is a centering unit which has in a housing 47 a viewing optics 48 which can comprise a purely optical system or a screen. An image 17' of a pattern disk 17 can be displayed in the viewing optics 48 by means of an electronic control unit 49, which is arranged in a housing lower part 50 for ergonomic reasons, and an input keyboard 57. This pattern disk 17 with the bores 21, 22 is mounted on support pins 52 of a carrier 51 and is held there by means of pins 54 on a hold-down 53. The pattern disk 17 can be aligned with the support pins 52 such that the holes for the pins 15, 16 come to lie in a fashion illustrated with reference to the axis intersection 46, and the bores 21, 22 appear as images 21', 22' in the viewing optics 48 in a fashion positionally accurate with reference to the axis intersection 46. A cursor 58 can now be moved relative to the images 21', 22' of the bores by means of the keyboard 57, and the position or the coordinates can be recorded by clicking.

This cursor 58 can, of course, also be moved by means of a computer mouse, and the coordinates of the bores 21, 22 can be recorded by clicking.

The coordinates $X_1, Y_1; X_2, Y_2$ can also be read off in the viewing optics 48 and noted down, or be recorded on suitable data media.

The centering device in accordance with FIG. 3 can be connected so as to exchange data with the spectacle lens edging machine in accordance with FIG. 2, with the result that the coordinates, determined in the centering device in accordance with FIG. 3, of the bores 21, 22 can be transmitted to the computer 10 of the spectacle lens edging machine and used there to control the drilling of the holes 21", 22".

The centering device in accordance with FIG. 3 is, moreover, used for the purpose of aligning a rough cast lens in a similar way as was described with reference to the pattern disk 17, in accordance with which a swinging arm 55 with a holding part 56, fastened thereon, in the form of a block or sucker is lowered onto the rough cast lens, and the holding part 56 is connected to the rough cast lens such that the rough cast lens can subsequently be inserted accurately in terms of position between the half shafts 7, 8 of the spectacle lens edging machine in accordance with FIG. 1 or FIG. 2, and can be form-ground. Such a centering device is described in DE 42 33 400 C1 of the same applicant.

The holes can then be drilled in the way described inside or outside a spectacle lens edging machine.

I claim:

1. A device to at least one of mark and drill holes in a workpiece spectacle lens, the device comprising:
    a spectacle lens edging machine including a computer to control form grinding of the workpiece spectacle lens, a grinding chamber, at least one grinding wheel in the grinding chamber, and a rotatable spectacle lens holding shaft which can be adjusted radially and axially relative to the grinding wheel and locked;
    an arrangement to at least one of mark and drill the holes into the workpiece spectacle lens, the arrangement including an encoding arrangement operable to detect an angle of the spectacle lens holding shaft, including an angle sensor operable to acquire an angle of rotation of the spectacle lens holding shaft; and
    a positioning device to position the arrangement, the positioning device including a position sensor to acquire a radial distance of the spectacle lens holding shaft from the grinding wheel, and including a position sensor to acquire an axial position of the spectacle lens holding shaft with reference to the grinding wheel, and an input device to accept input coordinates including at least one of rectangular input coordinates and polar input coordinates of the holes into the computer.

2. The device according to claim 1, wherein the arrangement is configured to be telescoped in an X-direction in a niche of the grinding chamber of the spectacle lens edging machine.

3. The device according to claim 2, wherein the arrangement is coupled in terms of movement to one of the spectacle lens holding shaft and the grinding wheel in the X-direction and a Z-direction, the positioning of the arrangement with reference to the workpiece spectacle lens held by the spectacle lens holding shaft being performed by the computer as a function of the input coordinates of the holes.

4. The device according to claim 1, wherein the arrangement is configured to be telescoped in an X-direction outside the grinding chamber of the spectacle lens edging machine, the spectacle lens holding shaft having in the region of the device a holder for a spectacle lens to be at least one of marked and drilled.

5. The device according to claim 1, wherein the arrangement further includes a scanning device to scan for a position of bores in a lens template, the template including one of a spectacle lens, a pattern disk and a support disk on the spectacle lens edging machine.

6. The device according to claim 5, wherein the scanning device is moveably coupled to one of the spectacle lens holding shaft and the grinding wheel in an x-direction and a z-direction.

7. The device according to claim 6, wherein the sensing element comprises a sensing pin.

8. The device according to claim 5, wherein the arrangement includes a sensing arm projecting radially into a region of the spectacle lens, held by the spectacle lens holding shaft, into a region of the template, and the arrangement further includes a sensing element on the sensing arm.

9. The device according to claim 8, wherein the sensing element comprises an optoelectronic sensing device.

10. The device according to claim 9, wherein the sensing element includes a linear optoelectronic sensing device on the sensing arm.

11. The device according to claim 10, wherein the sensing device is a charge-coupled (CCD), linear image scanner.

12. The device according to claim 11, wherein during a revolution of the spectacle lens holding shaft the sensing device is operable to detect both a position of the bores and a circumferential contour of the template, and is operable to feed them to the computer which is operable to control the form grinding and the at least one of marking and drilling of the holes.

13. The device according to claim 5, wherein the scanning device is arranged inside the grinding chamber.

14. The device according to claim 5, wherein the scanning device is arranged outside the grinding chamber.

15. The device according to claim 1, wherein the device also serves as scanning device which is operable to scan a position of the bores.

16. A centering device for lens blanks, comprising:
   a carrier configured to receive a lens blank or a lens template having at least one bore therethrough, the lens template including one of a template spectacle lens, a pattern disk and a support disk;
   a swinging arm having a holding part to affix the holding part on the lens blank;
   a display screen;
   an electronic control unit to display an image of the lens template on the display screen, the bore of the lens template being displayed with respect to a system of coordinates; and
   at least one of a keyboard and a mouse to move a cursor over the image of the lens template to record a position of the bore.

17. The centering device of claim 16, wherein the arm is capable of being telescoped.

18. A device to at least one of mark and drill holes in a workpiece spectacle lens, the device comprising:
   a spectacle lens edging machine including a computer to control form grinding of the workpiece spectacle lens, a grinding chamber, at least one grinding wheel in the grinding chamber, and a rotatable spectacle lens holding shaft which can be adjusted radially and axially relative to the grinding wheel and locked;
   an arrangement to at least one of mark and drill the holes into the workpiece spectacle lens, the arrangement including an encoding arrangement operable to detect an angle of the spectacle lens holding shaft, including an angle sensor operable to acquire an angle of rotation of the spectacle lens holding shaft, the arrangement further including an arm and a high-speed drill drive situated on the arm to at least one of mark and drill the holes, the arm being motionally coupled to one of the spectacle lens holding shaft and the grinding wheel in an X-direction and a Y-direction;
   a scanning arrangement having a sensing element to scan a position of the holes, the scanning arrangement being motionally coupled to at least one of the spectacle lens holding shaft and the grinding wheel in an X-direction and a Y-direction; and
   a positioning device to position the arrangement, the positioning device including a position sensor to acquire a radial distance of the spectacle lens holding shaft from the grinding wheel, and including a position sensor to acquire an axial position of the spectacle lens holding shaft with reference to the grinding wheel, and an input device to accept input coordinates including at least one of rectangular input coordinates and polar input coordinates of the holes into the computer.

19. The device of claim 18, wherein the sensing element includes one of a sensing pin and an optoelectronic sensing device.

* * * * *